(12) United States Patent
Wilpsbäumer

(10) Patent No.: US 6,796,410 B2
(45) Date of Patent: Sep. 28, 2004

(54) ARRANGEMENT FOR RELATIVE DISPLACEMENT OF A CURRENT COLLECTOR RELATIVE TO A TROLLEY WIRE

(75) Inventor: Ulrich Wilpsbäumer, Nordwalde (DE)

(73) Assignee: Stemmann-Technik GmbH, Schüttorf (DE)

(*) Notice: Subject to any disclaimer, the term of this patent is extended or adjusted under 35 U.S.C. 154(b) by 0 days.

(21) Appl. No.: 10/350,908

(22) Filed: Jan. 24, 2003

(65) Prior Publication Data

US 2003/0159900 A1 Aug. 28, 2003

(30) Foreign Application Priority Data

Jan. 25, 2002 (DE) .......................................... 102 02 804

(51) Int. Cl.[7] .................................................. B60L 5/00
(52) U.S. Cl. .......................................... 191/90; 191/85
(58) Field of Search .................................. 191/45 R, 64, 191/66, 67, 68, 69, 70, 85, 86, 87, 88, 90

(56) References Cited

U.S. PATENT DOCUMENTS

| | | | | | |
|---|---|---|---|---|---|
| 650,765 A | * | 5/1900 | Tomb | ........................... | 191/90 |
| 779,401 A | * | 1/1905 | Harrison | ....................... | 191/86 |
| 1,003,890 A | * | 9/1911 | Eveleth | ........................ | 191/50 |
| 1,089,414 A | * | 3/1914 | Jolliffe | ......................... | 191/90 |
| 1,372,920 A | * | 3/1921 | Waterhouse | ................. | 191/87 |
| 1,867,692 A | * | 7/1932 | Withers | ........................ | 191/90 |
| 4,034,832 A | * | 7/1977 | Lewis | ........................... | 191/86 |
| 5,115,405 A | * | 5/1992 | Cathala et al. | .............. | 700/275 |

* cited by examiner

Primary Examiner—Mark T. Le
(74) Attorney, Agent, or Firm—Henry M. Feiereisen; Ursula B. Day

(57) ABSTRACT

Arrangement for the relative relocation of a current collector relative to the trolley wire includes an electric drive coupled to a pivoting shaft of the current collector pressed against the trolley wire by force of a spring; with a rapid-action lowering unit in the form of a piston-cylinder aggregate integrated into a actuating member and provided in the form of an energy storage reservoir under pressure, so that the energy storage and the electrical drive are coupled with a sensor coupled to the current collector.

13 Claims, 1 Drawing Sheet

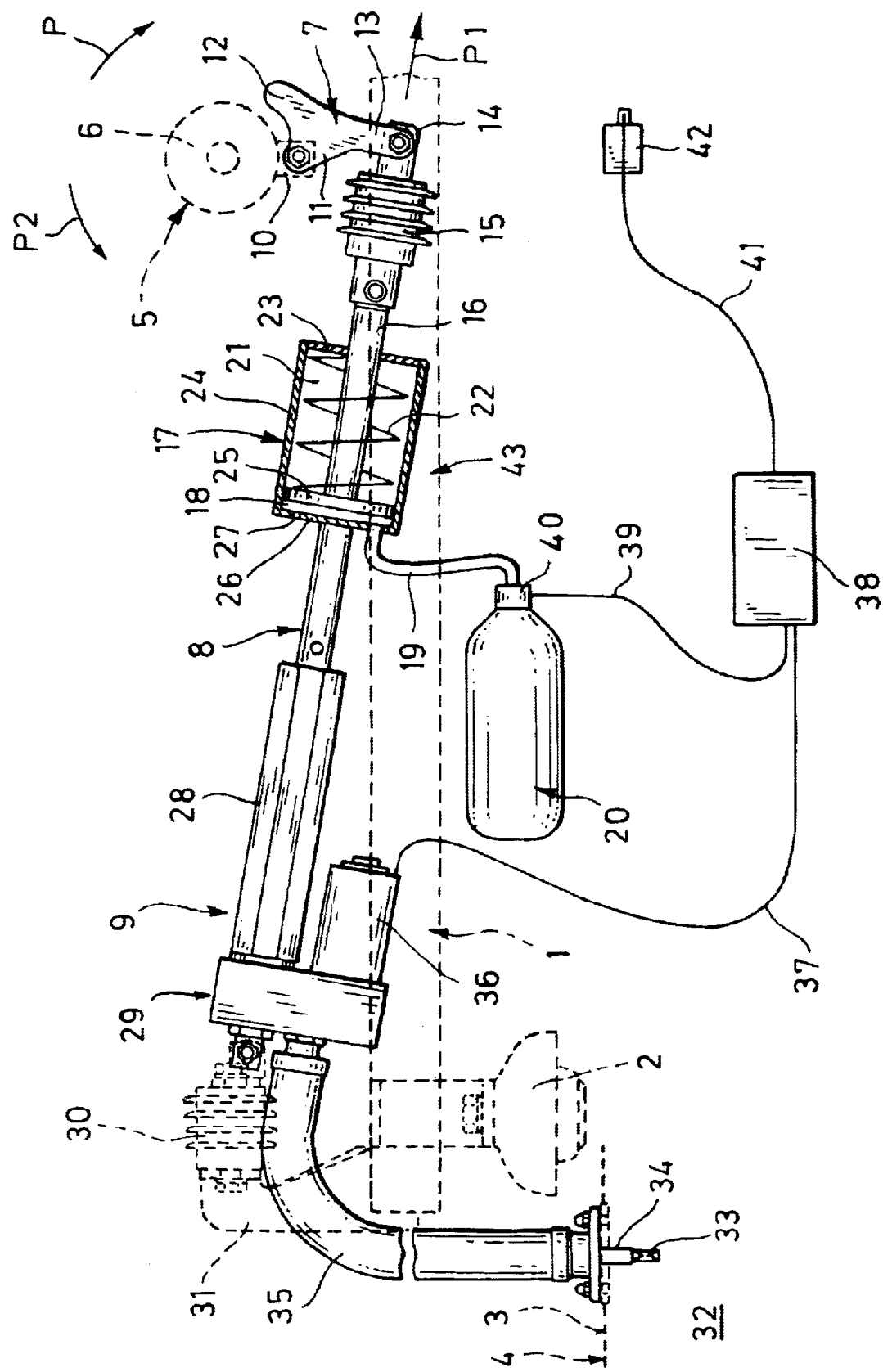

ARRANGEMENT FOR RELATIVE DISPLACEMENT OF A CURRENT COLLECTOR RELATIVE TO A TROLLEY WIRE

CROSS-REFERENCES TO RELATED APPLICATIONS

This application claims the priority of German Patent Application, Serial No. 102 02 804.4, filed Jan. 25, 2002 pursuant to 35 U.S.C. 119(a)–(d), the disclosure of which is incorporated herein by reference.

BACKGROUND OF THE INVENTION

The present invention relates to an arrangement for displacement of a current collector relative to a trolley wire and in particular an arrangement for displacement of a current collector, which is a component of a track-bound transport vehicle.

A current collector, which is part of a track-bound vehicle used in local traffic, such as for example a trolley or street car, is normally urged against the trolley wire by means of mechanical springs. The spring action permits varying lifting positions of the current collector between the trolley wire and the support at the roof of the vehicle to be adjusted during travel by the track-bound vehicle along a route.

It is generally known that for local traffic, lowering the current collector away from the trolley wire is carried out through an electrical drive. The drive can be a compact drive or a linear drive including a spindle.

Furthermore, it is known in the prior art to provide the current collector with a device by which a rapid-action lowering of the current collector can be realized when such lowering motion is forced by problems of various types, to thereby prevent damage to the current collector and the trolley wire.

Such rapid-action lowering devices suffer however from various drawbacks independent of their construction or configuration. In particular, when the current collector was lowered, for example due to an error, the current collector can then not be reactivated instantaneously. As a result, the transport vehicle may have to be towed. In some cases the transport vehicle has to be towed by means of an emergency towing vehicle. Oftentimes, passengers travelling in the vehicle are then required to leave the vehicle. Especially along the driving route of such a vehicle, the requirement of evacuating of the passengers from the transport vehicle creates unfavorable conditions especially for older or disabled passengers so that such an event may cause considerable discomfort and problems.

SUMMARY OF THE INVENTION

In view of the afore-described shortcomings, it would therefore be desirable and advantageous to provide an improved arrangement for a displacement of a current collector relative to the trolley wire, which obviates prior art shortcomings.

According to one aspect of the present invention, an arrangement for moving a current collector of a track-bound transport vehicle relative to a trolley wire includes an electric drive having an actuating member for linkage to a pivot shaft of a current collector which is urged by spring force against a trolley wire; a rapid-action-action lowering unit integrated in the actuating member and including a energy storage reservoir under pressure; and a sensor operatively connected to the current collector and coupling the energy storage reservoir with the electric drive.

The present invention resolves prior art problems by ensuring not only a rapid-action lowering of the current collector when required but that the current collector can be immediately reactivated, for example when an unwanted lowering of the current collector has occurred.

According to one feature of the present invention the rapid-action lowering unit provided with a energy storage reservoir under pressure is integrated into the actuating member between the electric drive and the pivoting shaft of the current collector and can be activated by means of mechanical, electrical hydraulic or pneumatic energy. The energy storage reservoir is coupled to a sensor associated with the current collector, in particular in the area where a rocker is located. When an irregularity is detected by the sensor in the area of the rocker, the rapid-action lowering unit becomes activated without noticeable delay for an immediate separation of the current collector from the trolley wire. As a result, the force of the lifting spring urging the current collector against the trolley wire is thereby overcome and at the same time the electrical drive can be shut down temporarily, at least for the first moment of lowering. After separation of the current collector from the trolley wire, the electric drive can then again be switched on taking up the lowering of the current collector with the rapid-action lowering unit or alternatively it can remain inactive for the duration of lowering the current collector.

Furthermore, the rapid-action lowering unit ensures that the free-running between the electrical drive and the pivoting shaft of the current collector is bridged in order to reduce friction and to ensure that a separation of the current collector from the trolley wire is realized without delay.

In the event, the current collector was inadvertently lowered due to erroneous information, the current collector can again be pressed against the trolley wire due to a stiffening of the rapid-action lowering unit, which is integrated into the control mechanism thereby ensuring that by means of the electric drive, or optionally in conjunction with the lifting springs, the current collector can again be pressed against the trolley wire, with the result that the transport vehicle can at least move, even if slowly, by itself.

The energy storage reservoir associated with the rapid-action lowering unit is preferably configured so it can be reactivated without complex technical operation.

In an especially advantageous embodiment of the present invention, the rapid-action lowering unit includes a pneumatically operated piston-cylinder assembly connected to a pneumatic pressure tank. Preferably, the pneumatic pressure tank can be configured also as a commercially available $CO_2$-container (pressure gas cartridge), which is easily exchangeable.

According to another feature of the present invention, the cylinder of the piston-cylinder assembly is connected to the pivoting shaft of the current collector by means of a spindle of an electric linear drive, and the piston rod is connected to the pivoting shaft of the current collector by means of the Y-shaped rocking lever.

Normally, the rocking lever carries out the de-coupling of the electrical drive from the pivoting shaft to be free-running at a range to be desired. As a result, the electrical drive cannot impact the movements of the current collector through higher frictional drag.

In accordance with another feature of the present invention, it is ensured that the influx of pressure gas into the piston compartment of the cylinder of the piston-cylinder assembly by means of the throttle opening can dissipate unobstructedly into the surrounding area. The return spring, which is incorporated into the piston rod compartment ensures that the piston cylinder assembly in itself is stiffening to thereby cause a direct impact from the electrical drive onto the pivoting shaft of the current collector.

In accordance with a further feature of the present invention, the coordination of the sequence of movements after a rapid-action lowering was triggered, a control that is memory programmable is incorporated in the sensor and the energy storage reservoir on the one hand and the electrical drive on the other hand.

BRIEF DESCRIPTION OF THE DRAWING

Other features and advantages of the present invention will be more readily apparent upon reading the following description of currently preferred exemplified embodiments of the invention with reference to the accompanying drawing, in which the sole drawing is a sectional side view of a frame attached to the roof of a transport vehicle via insulators showing the arrangement for relocating a current collector relative to the trolley wire according to the present invention;

DETAILED DESCRIPTION OF PREFERRED EMBODIMENTS

Throughout all the Figures, same or corresponding elements are generally indicated by same reference numerals. These depicted embodiments are to be understood as illustrative of the invention and not as limiting in any way.

Turning now to the drawing, there is shown a section of a frame 1 which is connected by means of insulators 2 to the roof 3 of a track-bound transport vehicle 4 destined for local travel (streetcar), not shown here in further detail. Frame 1 serves as support of the current collector 5, indicated here only by the pivoting shaft 6.

Pivoting shaft 6 is pivotably linked with the actuating member 8 of an electric drive 9 in the form of a linear drive via a rocking lever 7 of Y-shaped configuration. Pivoting shaft 6 is provided with a radial extension 10, which is rotatably connected with one of the legs 11 of rocking lever 7. A second leg 12 of rocking lever 7 has a round end-proximate configuration and can be biased against the pivoting shaft 6 as further described in the following paragraphs.

The third leg 13 of the rocking lever 7 is rotatably connected with the free end 14 of actuating member 8.

An insulator 15 is incorporated into the actuating member 8 and adjacent the connection between the third leg 13 of rocking lever 7 and the free end 14 of the actuating member 8. The insulator 15, an integral component of the actuating member 8 is removably connected with the piston rod 16 of a piston-cylinder assembly 17.

The piston compartment 18 of the piston-cylinder assembly 17 is coupled via a line 19 to a pneumatic pressure container 20, which is in the form of a pressure gas cartridge containing $CO_2$. A return spring in the form of a coil pressure spring is incorporated in the piston rod compartment 21 which is biased on the one hand against the cover 23 of the cylinder 24 of piston cylinder assembly 17 and on the other hand against piston 25. Furthermore, a throttle opening is shown at lid 26 of cylinder 24.

The actuating member 8 is connected to a spindle 28 of the electrical drive 9. The housing 29 of the electrical drive 9 is biased against insulator 30, which itself is fixed at frame 1 via a console 31.

A flexible shaft 34 extends between the housing 29 which houses the mechanism (not further shown in detail) of the electrical drive 9 and a manually operable lug 33 situated in the interior 32 of the transport vehicle. By means of the flexible shaft 34, spindle 28 can be manually operated when the electrical drive 9 is switched off. The flexible shaft is embedded for protection by a casing 35.

Motor 36 of electrical drive 9 is connected with the memory-programmable control 38 via line 37. This control 38 is furthermore connected to a trigger mechanism 40 of pressure container 20 not further shown here in detail via line 39. On the other hand, the control 38 is connected via a line 41 to a sensor 42. The sensor 42 is associated with the rocker (not shown here in detail) of the current collector.

In operation, the current collector 5 is urged against the trolley wire, which is not shown here in detail by means of mechanical lifting springs also not shown here in detail.

In order to realize possibly friction-free motions of the current collector 5 in relative positions between the frame 1 and the trolley wire when the transport vehicle is in transit, the rocking lever 7 is integrated between the pivoting shaft 6 and the actuating member 8 of the electrical drive 9. When the pivoting shaft rotates in direction of arrow P, the rocking lever 7 pivots around the connection with the free end 14 of the actuating member 8 so that the second leg 12 is not in contact with pivot shaft 6. When activating the electrical drive 9 in direction of arrow P1, the second leg 12, after overcoming the free-running position, bears against the circumference of the pivoting shaft 6, so that the pivoting shaft 6 can be turned against the force of the lifting springs (not shown here) in the direction of arrow P2.

When first detecting an irregularity by sensor 42 in the area of the rocker rest, sensor 42 triggers an impulse at the trigger mechanism 40 of pressure container 20, whereby pressure container 20 opens and pressure gas flows abruptly from the pressure gas container 20 via line 19 into the piston compartment 18 of the piston-cylinder assembly 17. Through the sudden pressure, piston 25 and the piston rod 16 are displaced in direction of arrow P1, so that the second leg 12 of rocking lever 7 gets to bear at the pivoting shaft 6 and shortly rotated in the direction of arrow P2, so that a rapid-action separation of the current collector from the trolley wire is realized. At the same time motor 36 of the electrical drive 9 can be activated via the control 38, so that the spindle 28 can follow the movement of the piston rod 16. This movement can occur simultaneously with the action upon the piston compartment 18 of the piston-cylinder unit 17 or it can occur time-delayed.

The sudden surge causes displacement of the piston 25 against the force of the return spring 22. At the same time pressure gas can dissipate via the throttle opening 27 into the surrounding are, so that after the rapid-action lowering, the rapid-action lowering unit 43 stiffens by means of the return spring 22 along the extension of the actuating member 8, so that through only the electric drive 9, either a further lowering of the current collector 5 or its postion in the lowered position is realized.

The pressure container 20 is exchangeably supported in frame 1 in a manner not further shown here in detail.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and their equivalents:

What is claimed is:

1. An arrangement for moving a current collector of a track-bound vehicle relative to a trolley wire, comprising:
    an electric drive having an actuating member for linkage to a pivot shaft of a current collector which is urged by spring force against a trolley wire;
    a rapid-action-action lowering unit integrated in the actuating member and including an energy storage reservoir under pressure; and
    a sensor operatively connected to the current collector and coupling the energy storage reservoir with the electric drive, wherein the energy storage reservoir is integrated into the actuating member between the electric drive and the pivoting shaft.

2. The arrangement of claim 1, wherein the energy storage reservoir is a pneumatic pressure container, said rapid-action-action lowering unit including a pneumatic piston-cylinder assembly connected to the pressure tank.

3. The arrangement of claim 2, wherein the piston-cylinder assembly includes a cylinder, and the electric drive is a linear drive having a spindle, and further comprising a Y-shaped rocking lever for connecting the cylinder and the spindle with the pivot shaft of the current collector.

4. The arrangement of claim 3, wherein the piston-cylinder assembly includes a piston for subdividing the cylinder in a piston compartment and a piston-rod compartment, wherein the piston compartment is connected to the pressure tank and connected via a throttle opening to the environment, and further comprising a return spring received in the piston-rod compartment.

5. The arrangement of claim 1, and further comprising a control unit integrated between the sensor and the energy storage reservoir, on the one hand, and the electric drive, on the other hand.

6. The arrangement of claim 5, wherein the control is memory-programmable.

7. An arrangement for moving a current collector of track-bound vehicle relative to the trolley wire comprising:
    an electric drive, which is one of a compact drive or a spindle drive having an actuating member for linkage to a pivot shaft of a current collector which is urged by spring force against a trolley wire;
    a rapid action lowering unit integrated in the actuating member and including an energy storage reservoir under pressure; and
    a sensor operatively connected to the current collector and coupling the energy storage reservoir with the electric drive, wherein the linkage to a pivot shaft includes a Y-shaped rocking lever for engaging and disengaging the pivot shaft of the current collector.

8. An arrangement for moving a current collector of a track-bound vehicle relative to the trolley wire comprising:
    an electric drive, which is one of a compact drive or a spindle drive having an actuating member for linkage to a pivot shaft of a current collector which is urged by spring force against a trolley wire;
    a rapid action lowering unit integrated in the actuating member and including an energy storage reservoir under pressure; and
    a sensor operatively connected to the current collector and coupling the energy storage reservoir with the electric drive.

9. The arrangement of claim 8, wherein the energy storage reservoir is a pneumatic pressure container, said rapid-action-action lowering unit including a pneumatic piston-cylinder assembly connected to the pressure tank.

10. The arrangement of claim 9, wherein the piston-cylinder assembly includes a cylinder and further comprising a Y-shaped rocking lever for connecting the cylinder and the spindle with the pivot shaft of the current collector.

11. The arrangement of claim 10, wherein the piston cylinder assembly includes a piston for subdividing the cylinder in a piston compartment and a piston-rod compartment, wherein the piston compartment is connected to the pressure tank and connected via a throttle opening to the environment, and further comprising a return spring received in the piston-rod compartment.

12. The arrangement of claim 8, and further comprising a control unit integrated between the sensor and the energy storage reservoir, on the one hand, and the electric drive, on the other hand.

13. The arrangement of claim 12, wherein the control is memory-programmable.

* * * * *